(12) United States Patent
Nishihara

(10) Patent No.: US 9,979,851 B2
(45) Date of Patent: May 22, 2018

(54) IMAGE FORMING APPARATUS AND IMAGE FORMATION IN A LOW NOISE MODE

(71) Applicant: Brother Kogyo Kabushiki Kaisha, Nagoya-shi, Aichi-ken (JP)

(72) Inventor: Masahiro Nishihara, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 47 days.

(21) Appl. No.: 15/055,029

(22) Filed: Feb. 26, 2016

(65) Prior Publication Data
US 2016/0255234 A1 Sep. 1, 2016

(30) Foreign Application Priority Data
Feb. 27, 2015 (JP) ................. 2015-039063

(51) Int. Cl.
*G06K 15/10* (2006.01)
*H04N 1/00* (2006.01)

(52) U.S. Cl.
CPC ..... *H04N 1/00994* (2013.01); *H04N 1/00244* (2013.01); *H04N 1/00347* (2013.01); *H04N 2201/0094* (2013.01)

(58) Field of Classification Search
None
See application file for complete search history.

(56) References Cited

U.S. PATENT DOCUMENTS

| | | | | |
|---|---|---|---|---|
| 2003/0074501 A1* | 4/2003 | Anzai | ................... | G06K 15/00 710/72 |
| 2006/0221384 A1* | 10/2006 | Tanaka | .................. | G06F 3/1213 358/1.15 |
| 2006/0244991 A1* | 11/2006 | Tenger | .................. | G06F 3/1261 358/1.15 |
| 2007/0046987 A1* | 3/2007 | Shima | ................... | G06F 3/1215 358/1.15 |
| 2010/0110489 A1* | 5/2010 | Kanda | ................ | H04N 1/00352 358/1.15 |

FOREIGN PATENT DOCUMENTS

| | | |
|---|---|---|
| JP | 2006-163870 A | 6/2006 |
| JP | 2007-057606 A | 3/2007 |

* cited by examiner

*Primary Examiner* — Haris Sabah
(74) *Attorney, Agent, or Firm* — Banner & Witcoff, Ltd.

(57) ABSTRACT

An image forming apparatus includes an image forming device and a communication device configured to perform data communication with at least one external image forming apparatus. A first mode is a mode in which a speed of image forming is a first speed, and the second mode is a mode in which the speed of the image forming is a second speed less than the first speed. When image forming is to be performed in a second mode, the image forming apparatus determines an image forming apparatus to be used to perform first image forming to at least one first external image forming apparatus. The image forming apparatus transmits image data relating to the first image forming to the at least one first external image forming apparatus and controls the image forming device to form an image relating to second image forming.

13 Claims, 8 Drawing Sheets

FIG.3

PRINT SETTING TABLE

| OPERATION NOISE | NORMAL MODE: 70dB | | | LOW NOISE MODE: 60dB | | | | | |
|---|---|---|---|---|---|---|---|---|---|
| PRINTING SPEED | NORMAL MODE: 100ppm | | | LOW NOISE MODE: 50ppm | | | | | |
| LOW-NOISE-MODE SETTING STATE ※1 | ON | | | | | | | | |
| PRINTING OPERATION STATE ※2 | ON | | | | | | | | |
| POSITION ATTRIBUTE ※3 | A | | | | | | | | |

LOW-NOISE-MODE JOB TRANSFER SETTING

| | | PRIORITY | NAME OF DESTINATION PRINTING APPARATUS | DESTINATION ADDRESS | LOW-NOISE FUNCTION | LOW NOISE INSTRUCTION | OPERATION NOISE (dB) | DISTANCE (m) | PRINTING SPEED (ppm) | POSITION ATTRIBUTE | DIVIDING ATTRIBUTE | OWN PRINTING |
|---|---|---|---|---|---|---|---|---|---|---|---|---|
| JOB DESTINATION LIST | | 1 | SOHO-777W | 10.20.0.2 | ○ | NOT REQUIRED | NORMAL:70 LOW NOISE:50 | 20 | NORMAL:100 LOW NOISE:50 | B | ALONE | NOT REQUIRED |
| | | 2 | MFP-ABC001 | 10.20.0.3 | ○ | REQUIRED | NORMAL:70 LOW NOISE:50 | 1 | NORMAL:80 LOW NOISE:50 | A | ALONE | REQUIRED |
| | | 3 | PRT-xyz01 | 10.20.0.4 | × | — | 60 | 7 | 70 | A | TOGETHER | NOT REQUIRED |
| | | 4 | PRT-xyz02 | 10.20.0.5 | × | — | 60 | 7 | 70 | A | TOGETHER | NOT REQUIRED |
| | | ... | ... | ... | ... | ... | ... | ... | ... | ... | ... | ... |
| MAXIMUM NUMBER OF DESTINATIONS | 2 | | | | | | | | | | | |
| JOB DIVIDING METHOD ※4 | A | | | | | | | | | | | |

※1 : ON (LOW NOISE MODE) OR OFF (NORMAL MODE)
※2 : ON (CURRENTLY PRINTING) OR OFF (STANDBY STATE)
※3 : A (POSITION REQUIRING CONSIDERATION OF OPERATION NOISE) OR B (POSITION NOT REQUIRING CONSIDERATION OF OPERATION NOISE, E.G., COPY ROOM)
※4 : A (DIVIDING ALL PAGES EQUALLY) OR B (DIVIDING COPIES)

IMAGE FORMING APPARATUS AND IMAGE FORMATION IN A LOW NOISE MODE

CROSS REFERENCE TO RELATED APPLICATION

The present application claims priority from Japanese Patent Application No. 2015-039063, which was filed on Feb. 27, 2015, the disclosure of which is herein incorporated by reference in its entirety.

BACKGROUND

Technical Field

The following disclosure relates to an image forming apparatus configured to form an image on received image data.

Description of the Related Art

There are known various kinds of image forming apparatuses having an image forming function for forming an image on a recording sheet. Examples of the image forming apparatuses include printers, copying machines, and multifunction peripherals (MFPs). As the image forming apparatuses, there are proposed image forming apparatuses enabled to change a level of sound (operation noise) produced from the image forming apparatus in image forming.

One example of such an image forming apparatus has a low noise mode as its operation mode. When the operation mode is set at the low noise mode, image forming is performed with operation noise lower than that in a normal operation mode (hereinafter may be referred to as "normal mode").

SUMMARY

The image forming apparatus having the low noise mode can perform image forming with low operation noise as needed. Thus, a user can change the operation mode of the image forming apparatus, depending upon requirement of quietness. For example, the user can use the image forming apparatus in the normal mode during the daytime and in the low noise mode during the nighttime.

When the operation mode is set to the low noise mode, however, the speed of the image forming is reduced instead of lower operation noise in the image forming. This is because the lower operation noise in the low noise mode is achieved by reducing the speed of conveyance of the recording sheet when compared with the normal mode.

Some image forming apparatuses have not only the low noise mode but also a specific operation mode in which the speed of the image forming is lower than in the normal mode. One example of the image forming apparatuses is an image forming apparatus having a high image quality mode in which image forming is performed with higher image quality than in the normal mode. In this image forming apparatus, when the operation mode is set at the high image quality mode, the image quality is higher but the speed of the image forming is lower than in the normal mode.

In the image forming apparatus having the specific operation mode such as the low noise mode and the high image quality mode, when the operation mode is set to the specific operation mode, the image forming apparatus achieves effects in accordance with the set operation mode, but the user has to wait a longer time than in the normal mode for the completion of image forming.

Accordingly, an aspect of the disclosure relates to an image forming apparatus having a specific operation mode in which a speed of image forming is lower than in a normal mode and configured to finish image forming quickly even in the specific operation mode.

In one aspect of the disclosure, an image forming apparatus includes: an image forming device configured to form an image on a recording medium; a communication device configured to perform data communication with at least one external image forming apparatus; and a controller configured to perform: receiving an image forming instruction for instructing image forming on a plurality of recording media each as the recording medium; determining whether a mode of image forming to be performed by the image forming device is a first mode or a second mode, in response to receiving the image forming instruction for instructing image forming on the plurality of recording media, the first mode being a mode in which a speed of the image forming is a first speed, the second mode being a mode in which the speed of the image forming is a second speed less than the first speed; in response to determining that the mode of the image forming to be performed by the image forming device is the second mode, determining an image forming apparatus to be used to perform first image forming to at least one first external image forming apparatus, the first image forming being image forming on at least one recording medium in the image forming on the plurality of recording media based on the image forming instruction, the at least one first external image forming apparatus being at least one of the at least one external image forming apparatus; controlling the communication device to transmit image data relating to the first image forming to the at least one first external image forming apparatus; and when the image forming on the plurality of recording media has second image forming different from the first image forming, controlling the image forming device to form an image relating to the second image forming.

In another aspect of the disclosure, an image forming apparatus includes: an image forming device configured to form an image on a recording medium; a communication device configured to perform data communication with an external image forming apparatus; and a controller. The image forming device includes, as a mode of image forming, a first mode and a low noise mode in which operation noise in image forming is less than that in the first mode. The controller is configured to perform: controlling the communication device to receive image data from the external image forming apparatus, the image data relating to image forming on at least one recording medium in image forming on a plurality of recording media for which the external image forming apparatus is instructed, the image forming on at least one recording medium being to be performed by the image forming apparatus on behalf of the external image forming apparatus; setting the operation mode to the low noise mode in response to receiving, from the external image forming apparatus, the image data and an instruction indicating that the image forming apparatus should perform the image forming in the low noise mode; and controlling the image forming device to form at least one image based on the received image data.

In another aspect of the disclosure, an image forming apparatus includes: an image forming device configured to form an image on a recording medium; a communication device configured to perform data communication with at least one external image forming apparatus; and a controller. The controller is configured to perform: receiving an image forming instruction for forming image of a plurality of pages; determining whether a mode of image forming to be performed by the image forming device is a first mode or a second mode, in response to receiving the image forming instruction, the first mode being a mode in which a speed of the image forming is a first speed, the second mode being a mode in which the speed of the image forming is a second speed less than the first speed; in response to determining that the mode is the second mode, determining a first external image forming apparatus; determining first image data on first image, the first image being of at least one page of the plurality of pages; determining second image data on second image, the second image being of at least another page of the plurality of pages; controlling the communication device to transmit the first image data to the first external image forming apparatus; and controlling the image forming device to form the second image on the recording medium.

BRIEF DESCRIPTION OF THE DRAWINGS

The objects, features, advantages, and technical and industrial significance of the present disclosure will be better understood by reading the following detailed description of the embodiments, when considered in connection with the accompanying drawings, in which:

FIG. 3 is a view for explaining a print setting table;

DETAILED DESCRIPTION OF THE EMBODIMENTS

Hereinafter, there will be described embodiments by reference to the drawings.

First Embodiment

1. Overview of Image Forming System

Figure 1:
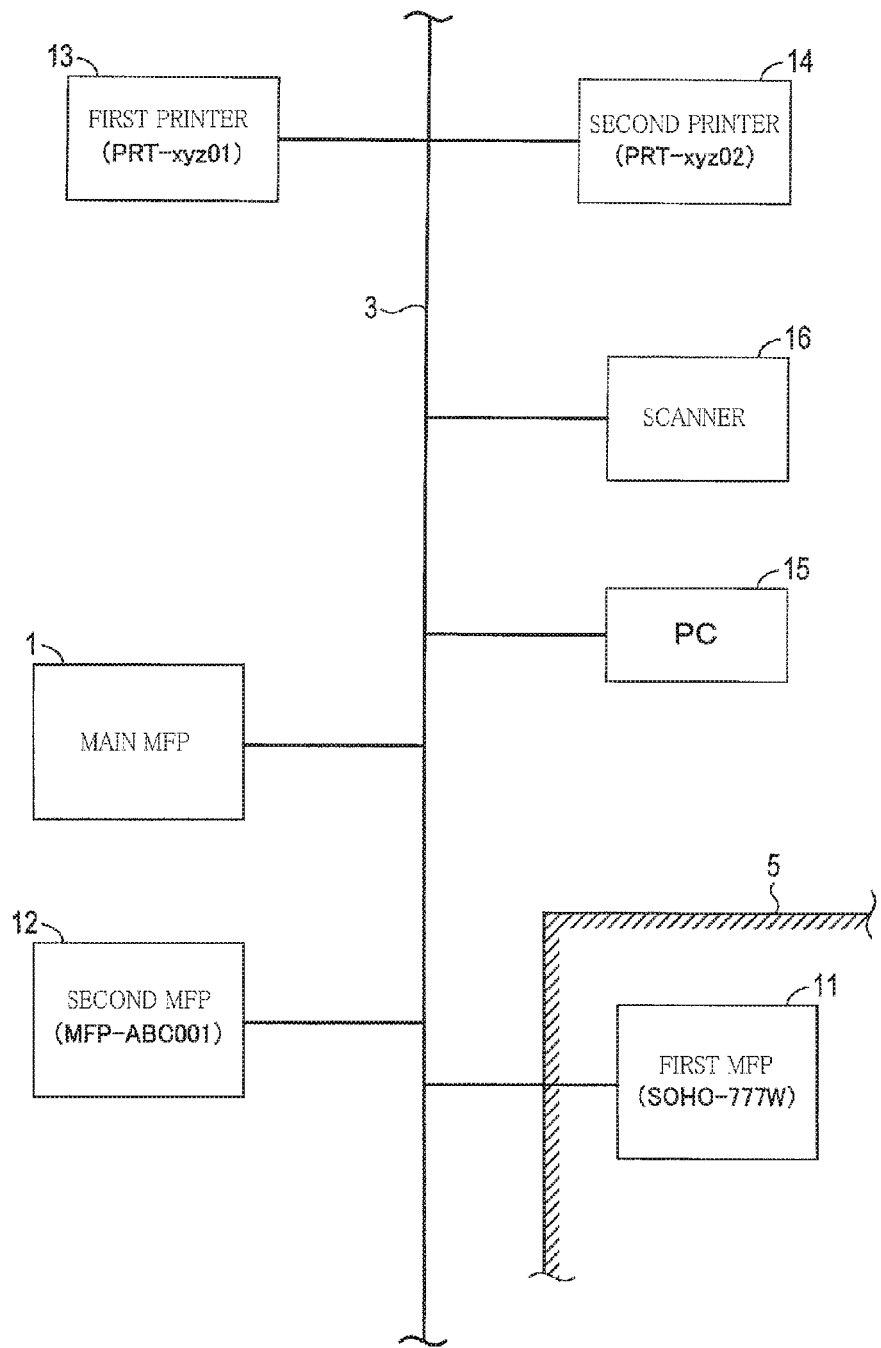
FIG. 1 is a block diagram illustrating a general configuration of an image forming system.

As illustrated in FIG. 1, an image forming system in a first embodiment includes a main multi-function peripheral (MFP) 1, a first MFP 11, a second MFP 12, a first printer 13, a second printer 14, a personal computer (PC) 15, and a scanner 16 which are connected to each other over a network 3 so as to enable data communication therebetween.

Each of the main MFP 1, the first MFP 11, and the second MFP 12 has a plurality of functions including: a scanning function for reading an image on a document; a printing function for forming an image on a recording medium such as a recording sheet and an OHP sheet; a facsimile function for transmitting and receiving facsimile data. It is noted that an apparatus name of the first MFP 11 is "SOHO-777W", and an apparatus name of the second MFP 12 is "MFP-ABC001".

Each of the first printer 13 and the second printer 14 has at least the printing function. It is noted that an apparatus name of the first printer 13 is "PRT-xyz01", and an apparatus name of the second printer 14 is "PRT-xyz02".

The main MFP 1 is capable of performing data communication with the first MFP 11, the second MFP 12, the first printer 13, and the second printer 14 (as one example of at least one external image forming apparatus). The main MFP 1 receives various kinds of information from the apparatuses over the data communication. Examples of the various kinds of information include a low-noise-mode setting state, a printing operation state, the apparatus name, an IP address, the presence or absence of a low noise function, operation noise in printing (noise caused by printing), and a printing speed. These kinds of information will be described below in detail.

In the following description, each of the main MFP 1, the first MFP 11, the second MFP 12, the first printer 13, and the second printer 14 may be simply referred to as "printing apparatus" in the case where these apparatuses need not be distinguished from each other.

It is assumed that the printing apparatuses other than the first MFP 11 are disposed in the same room (hereinafter referred to as "working room"). The second MFP 12 is disposed next to the main MFP 1, and a distance therebetween is about 1 m. Each of the first printer 13 and the second printer 14 arranged next to each other is spaced apart from the main MFP 1 at a distance of about 7 m.

In some cases, quietness of equal to or greater than a certain level is required for the working room, depending upon a time period and kinds of work performed in the room. Also, quietness is required in the entire working room in some case and at a specific area in the working room (e.g., an area near the main MFP 1) in another case. Thus, in the image forming system in the first embodiment, at least the main MFP 1 and the second MFP 12 are capable of operating in a low noise mode in which the operation noise in printing is less than that in a normal mode.

The first MFP 11 (as one example of a third external image forming apparatus) is disposed in a copy room 5 next to the working room. A plurality of printing apparatuses including the first MFP 11 and business machines are disposed in the copy room 5. It is assumed that quietness is not required in the copy room 5 principally.

The scanner 16 has a function for reading an image formed on a document and creating scan data representative of the read image. The PC 15 is an information processor configured to perform various kinds of information processings according to programs such as an operating system (OS) and various kinds of application software. The PC 15 is installed with a printer driver as a device driver for controlling the printing function of at least the main MFP 1 among the printing apparatuses. This configuration enables the main MFP 1 to perform printing based on image data transmitted from the PC 15. It is noted that the PC 15 may be installed with a printer driver of any of the printing apparatuses other than the main MFP 1.

The PC 15 is also installed with a scanner driver as a device driver for controlling the scanner 16. This configuration enables the PC 15 to control the scanner 16 to perform scanning to receive scan data as image data representing a scanned image. The PC 15 can transmit the received scan data to the main MFP 1 and control the main MFP 1 to print an image or images based on the scan data, for example.

It is noted that the PC 15 can control the scanner 16 to transmit the scan data created by the scanner 16 directly to any of the printing apparatuses and control it to perform printing. Also, a user may operate the scanner 16 to instruct the scanner 16 to perform scanning and transmission of the scan data, without control of the PC 15.

The main MFP 1 has a printing-processing distributing function. The printing-processing distributing function enables the main MFP 1 to cause at least one of the other printing apparatuses to perform printing for the entirety or a portion of a print job on a specific condition.

Each of the printing apparatuses other than the main MFP 1 has a proxy printing function corresponding to the printing-processing distributing function of the main MFP 1. That is, when each of the printing apparatuses other than the main MFP 1 receives image data and a print instruction for printing the image data from the main MFP 1 using the printing-processing distributing function, the printing apparatus performs printing based on the image data on behalf of the main MFP 1.

2. Configuration of Each Printing Apparatus 2-1. Configuration of Main MFP 1

Figure 2A:
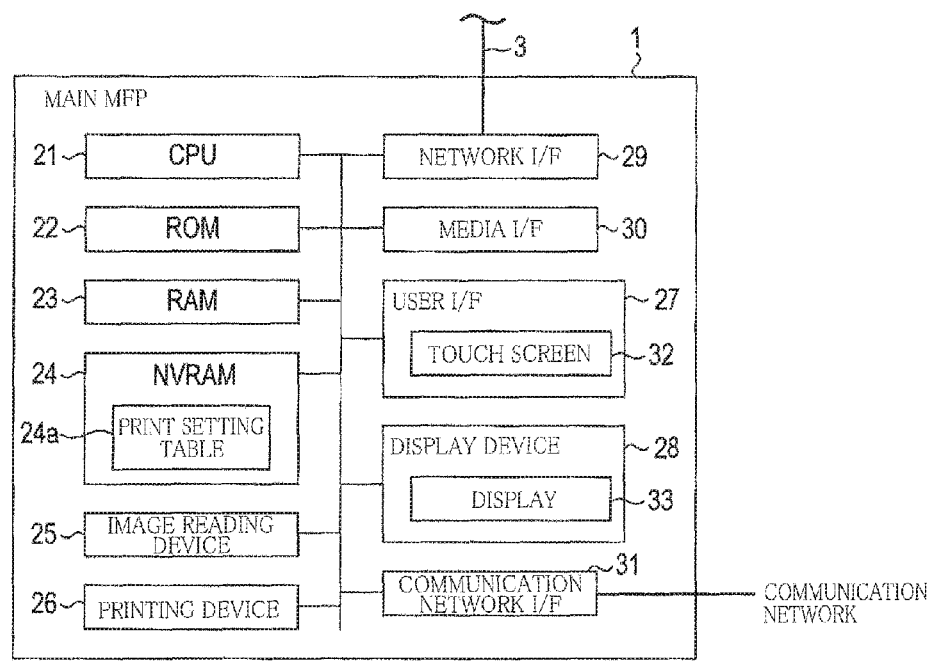
FIG. 2A is a block diagram illustrating a general configuration of a main multi-function peripheral (MFP)

As illustrated in FIG. 2A, the main MFP 1 includes a CPU 21, a ROM 22, a RAM 23, an NVRAM 24, an image reading device 25, a printing device 26, a user interface 27, a display device 28, a network interface 29, a media interface 30, and a communication network interface 31.

The CPU 21 controls the devices of the main MFP 1 and executes calculations according to programs stored in devices such as the ROM 22 and the NVRAM 24. The RAM 23 is used as a main memory which is directly accessed from the CPU 21.

The NVRAM 24 is an electrically rewritable non-transitory memory. The NVRAM 24 stores various kinds of setting information relating to the main MFP 1. One example of the setting information stored in the NVRAM 24 is a print setting table 24a. FIG. 3 illustrates the print setting table 24a which will be described below in detail. The ROM 22 or the NVRAM 24 stores a program for a print control process which will be described below with reference to FIG. 4.

The image reading device 25 is one of devices for achieving the scanning function. The image reading device 25 includes an image sensor to read an image formed on a document. The image reading device 25 creates scan data representing the image read by the image sensor.

The printing device 26 is one of devices for achieving the printing function. The printing device 26 can print an image on one of various kinds of recording medium based on various kinds of image data containing the scan data read by the image reading device 25. Examples of the recording medium include printing sheets of various sizes, postcards, and OHP sheets. In the following description, the various kinds of recording medium will be referred to as "sheet".

The main MFP 1 according to the first embodiment is capable of receiving image data for printing by various routes and performing printing based on the received image data. Examples of the routes include: a route in which the image data as the scan data is received by reading of an image formed on a document using the scanning function as described above; a route in which the image data is received from the PC 15 over the network 3; a route in which the image data is received from the scanner 16 over the network 3; and a route in which the image data is received from any of various storages via the media interface 30.

The user interface 27 is an input device which accepts an input operation performed by the user. The user interface 27 includes various input devices such as a touch screen 32 and operation buttons, not illustrated. The display device 28 includes a display 33 (e.g., a liquid crystal display) for displaying information. The touch screen 32 is superposed on a display region of the display 33.

The network interface 29 is an interface for connecting the main MFP 1 to the network 3. The communication network interface 31 is an interface for performing data communication with external devices over a communication network (a telephone network in the present embodiment). Transmission and reception of the facsimile data in the facsimile function are performed via the communication network interface 31.

The media interface 30 is an interface on which a writable non-transitory storage medium, not illustrated, is mountable. The media interface 30 controls writing and reading of data to and from the storage medium. Examples of the storage medium mountable on the media interface 30 include a USB memory, and various card-type flash memories.

In the present embodiment, the network 3 enables data communication using the internet protocol (IP) as communications protocol. Thus, IP addresses are respectively assigned to devices connected to the network 3 and performs data communication over the network 3. It is noted that the communications protocol for the network 3 is not limited to the IP. Also, a physical configuration of the network 3 (e.g., a wired network or a wireless network) is not limited in particular.

Operation modes of the main MFP 1 include at least a normal mode (as one example of a first mode) and the low noise mode (as one example of a second mode). In the low noise mode, more specifically, a sheet is conveyed at a lower speed during printing than in the normal mode, whereby lower operation noise is caused from the main MFP 1 during printing than in the normal mode. That is, great differences between the normal mode and the low noise mode are the operation noise and the printing speed during printing. When the normal mode and the low noise mode are compared, the printing speed is high (for example, the printing speed during image formation is a first speed), but the operation noise during printing is high in the normal mode. In the low noise mode, on the other hand, the operation noise during printing is low, but the printing speed is low (for example, the printing speed during image formation is a second speed lower than the first speed).

It is noted that operation noise caused by a printing apparatus means a sound pressure level of a sound produced by the printing apparatus at a specific position near the printing apparatus during printing performed by the printing apparatus.

As well known, the sound pressure level is a physical quantity which represents a ratio between a sound pressure at the specific position and a reference value (e.g., 20 µPa) in common logarithm. The specific position may be an operator position or a bystander position, for example. The specific position (e.g., a position or a distance relative to the printing apparatus) may be determined as needed.

In the normal mode of the main MFP 1 according to the first embodiment, the operation noise is 70 dB, and the printing speed is 100 ppm, for example. In the low noise mode, the operation noise is 60 dB that is less than that in the normal mode, and the printing speed is 50 ppm that is less than that in the normal mode. It is noted that "ppm" is an abbreviation of "page per minute" which is a well-known unit representing the printing speed.

In the main MFP 1, as illustrated in FIG. 3, the print setting table 24a stored in the NVRAM 24 stores information relating to the operation noise and the printing speed of the main MFP 1 in advance. Specifically, as illustrated in FIG. 3, the print setting table 24a stores information indicating that the operation noise is 70 dB in the normal mode and is 60 dB in the low noise mode, and the printing speed is 100 ppm in the normal mode and is 50 ppm in the low noise mode. For example, the information about the operation noise and the printing speed is stored when the main MFP 1 is purchased by a consumer, for example, when the main MFP 1 is manufactured or shipped from a factory.

The print setting table 24a further stores a low-noise-mode setting state, a printing operation state, and a position attribute about the main MFP 1. The low-noise-mode setting state is information indicating whether the main MFP 1 is currently in the low noise mode. Each time when the operation mode of the main MFP 1 is switched, the CPU 21 changes the low-noise-mode setting state stored in the print setting table 24a. Specifically, the CPU 21 switches the low-noise-mode setting state to OFF when the operation mode is in the normal mode, and the CPU 21 switches the low-noise-mode setting state to ON when the operation mode is in the low noise mode.

The user can operate the user interface 27 to switch the operation mode. Thus, each time when the user switches the operation mode, the CPU 21 switches the operation mode to the operation mode set by the user and overwrites the low-noise-mode setting state stored in the print setting table 24a to the operation mode set by the user. It is noted that the operation mode may be switched from a device outside the main MFP 1. For example, the PC 15 may be operated to set the operation mode of the main MFP 1.

The printing operation state stored in the print setting table 24a indicates whether printing is being performed in the main MFP 1. When printing is not being performed by the printing device 26 (that is, the printing device 26 is in a standby state), the CPU 21 of the main MFP 1 sets the printing operation state stored in the print setting table 24a to OFF. When printing is being performed by the printing device 26, the CPU 21 sets the printing operation state stored in the print setting table 24a to ON.

The position attribute stored in the print setting table 24a is information indicating an attitude of a position at which the main MFP 1 is installed. In the present embodiment, two position attributes A, B are provided as the position attribute. Any one of the position attributes A, B is stored in the print setting table 24a. The position attribute A indicates that the main MFP 1 is installed at a place where consideration about the operation noise is required (that is, the main MFP 1 is required to be operated in the low noise mode in some cases). The position attribute B indicates that the main MFP 1 is installed at a place where consideration about the operation noise is not required (that is, the main MFP 1 is normally not required to be operated in the low noise mode).

The position attribute is determined by a position of the main MFP 1. Thus, the position attribute is normally input by the user. When having determined the installation position of the main MFP 1, the user operates the user interface 27 to input the position attribute determined depending upon the installation position of the main MFP 1. When the position attribute is input by the user, the CPU 21 stores one of the position attributes A, B which is input by the user, into the print setting table 24a.

In the example in FIG. 3, the operation mode is set at the low noise mode, printing is being performed by the printing device 26, and the position attribute is set at the position attribute A.

2-2. Configuration of Printing Apparatuses other than Main MFP 1

Each of the first MFP 11 and the second MFP 12 has a hardware configuration similar to that of the main MFP 1 illustrated in FIG. 2A and has various functions such as the scanning function, the printing function, and the facsimile function.

Figure 2B:
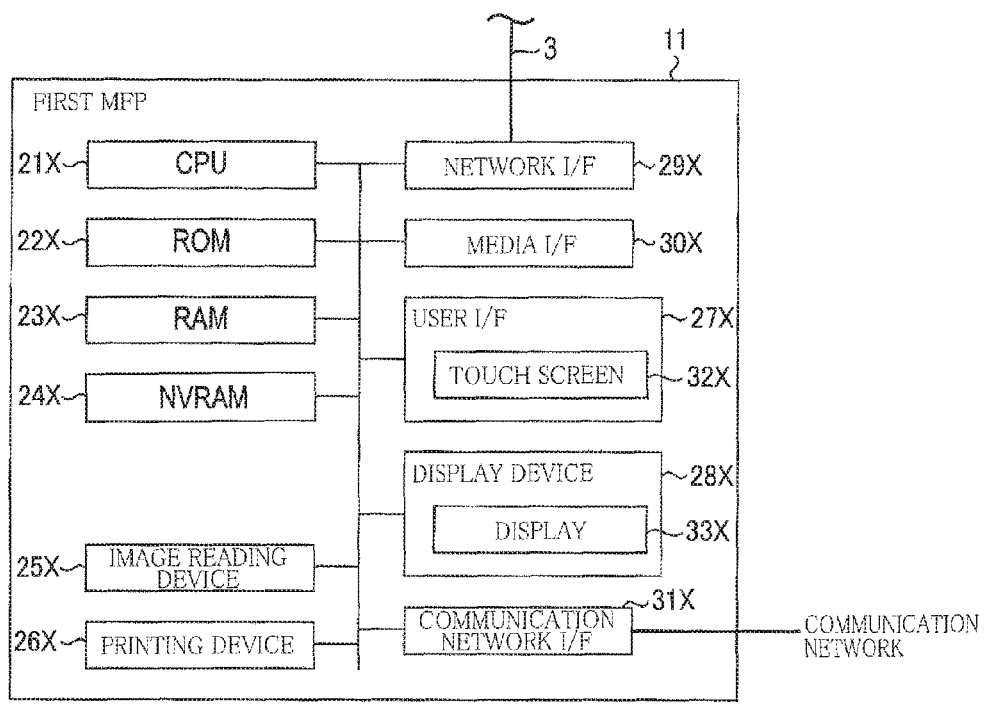
FIG. 2B is a block diagram illustrating a general configuration of a first MFP.

Like the main MFP 1, the first MFP 11 as one example of a second external image forming apparatus has the low noise mode as the operation mode. In the first MFP 11, the operation noise is 70 dB in the normal mode and is 60 dB in the low noise mode. In the first MFP 11, the printing speed is 100 ppm in the normal mode and is 50 ppm in the low noise mode. Like the main MFP 1, as illustrated in FIG. 2B, the first MFP 11 includes a CPU 21X, a ROM 22X, a RAM 23X, an NVRAM 24X, an image reading device 25X, a printing device 26X, a user interface 27X, a display device 28X, a network interface 29X, a media interface 30X, a communication network interface 31X, a touch screen 32X, and a display 33X.

Like the main MFP 1, the second MFP 12 has the low noise mode as the operation mode. In the second MFP 12, the operation noise is 70 dB in the normal mode and is 60 dB in the low noise mode. In the second MFP 12, the printing speed is 80 ppm in the low noise mode and is 50 ppm in the normal mode.

Each of the first printer 13 and the second printer 14 does not have the low noise mode as the operation mode. In each of the first printer 13 and the second printer 14, the operation noise is 60 dB, and the printing speed is 70 ppm.

2-3. Explanation for Low-Noise-Mode Job Transfer Setting in Main MFP 1

As described above, the main MFP 1 has the printing-processing distributing function, and the printing apparatuses other than the main MFP 1 have the proxy printing function.

More specifically, the printing-processing distributing function of the main MFP 1 is a function in which in the case where the operation mode of the main MFP 1 is the low noise mode, when printing is to be performed for a print job according to an instruction for printing on a plurality of sheets, the main MFP 1 causes each of at least one of the other printing apparatuses to partly perform the printing for the print job on behalf of the main MFP 1. In other words, the main MFP 1 causes each of at least one of the other printing apparatuses to print at least one of all the pages to be printed.

Various kinds of information relating to the printing-processing distributing function are determined based on a low-noise-mode job transfer setting stored in the print setting table 24a stored in the main MFP 1. Examples of the information include: information about which printing apparatuses are to be used to perform printing on behalf of the main MFP 1 when the main MFP 1 executes the printing-processing distributing function; information about how many pages each of at least one of the other printing apparatuses is to perform printing among all the pages; and information about whether the low noise mode is to be set for another printing apparatus to be used to perform printing on behalf of the main MFP 1 when the printing apparatus has the low noise mode.

As the low-noise-mode job transfer setting, as illustrated in FIG. 3, the print setting table 24a at least stores a job destination list, the maximum number of destinations, and a job dividing method.

The job destination list is a list of the printing apparatuses other the main MFP 1 which may be candidates (destination printing apparatuses) for performing a portion or the entirety of printing on a plurality of sheets on behalf of the main MFP 1. The job destination list contains various kinds of information for each destination printing apparatus.

Examples of the information include: a destination address represented by the IP address of the printing apparatus; the presence or absence of the low noise function of the printing apparatus; requirement of a low noise instruction; the operation noise; a distance between the printing apparatus and the main MFP 1 (e.g., a direct distance); the printing speed; the position attribute; a dividing attribute; and requirement of own printing.

The presence or absence of the low noise function is information about whether the printing device has the low noise mode as the operation mode. The requirement of the low noise instruction is information about whether the operation mode should be set to the low noise mode when the proxy printing is performed.

The dividing attribute is information about whether another or other printing apparatuses are required to perform printing in addition to the printing apparatus, or the printing apparatus is enough to perform the entire proxy printing. When the dividing attribute is set at "ALONE", only the printing apparatus is enough to perform the proxy printing, and there is no need for the other printing apparatuses to perform proxy printing, as long as the printing apparatus can perform printing on behalf of the main MFP 1. When the dividing attribute is set at "TOGETHER", not only the printing apparatus but also another or other printing apparatuses should perform printing on behalf of the main MFP 1, that is, a plurality of printing apparatuses should perform printing on behalf of the main MFP 1.

The requirement of own printing is information about whether, when the main MFP 1 uses the printing-processing distributing function to cause another or other printing apparatuses to perform printing on behalf of the main MFP 1, the main MFP 1 is to perform printing for a portion of the print job or to cause another or other printing apparatuses to perform printing or the entire print job on behalf of the main MFP 1 without printing by the main MFP 1. When the requirement of own printing is set at "NOT REQUIRED", the main MFP 1 is not to perform printing. When the requirement of own printing is set at "REQUIRED", the main MFP 1 is also to perform printing, that is, the main MFP 1 shares the entire print job with another or other printing apparatuses.

The information stored in the print setting table 24a for each destination printing apparatus is set by the user in this first embodiment. That is, the job destination list is blank at the shipment of the main MFP 1. After the purchase of the main MFP 1, the user of the main MFP 1 can register destination printing apparatuses to the job destination list stored in the print setting table 24a by performing an input operation on the user interface 27 or on an external device such as the PC 15.

The user can determine how many destination printing apparatuses are registered. In the case where a plurality of destination printing apparatuses are registered, priorities may be given to the respective destination printing apparatuses. In the case where the priorities are given to the respective destination printing apparatuses, the destination printing apparatus assigned with the highest priority normally performs printing on behalf of the main MFP 1, and when the destination printing apparatus assigned with the highest priority cannot perform printing on behalf of the main MFP 1, the destination printing apparatus that is second in priority after the destination printing apparatus assigned with the highest priority performs printing.

It is noted that the information is stored into the job destination list stored in the print setting table 24a by inputting and registering operations of the user in the present embodiment, but a portion of the information may be received and registered by the main MFP 1.

For example, when at least one of the name of the destination printing apparatus and the IP address assigned thereto is input by the user, the main MFP 1 may automatically access the printing apparatus to receive information such as the presence or absence of the low noise function, the operation noise, and the printing speed.

For example, the main MFP 1 may search for the printing apparatuses connected to the network 3 and receive information such as the apparatus name, the IP address, the presence or absence of the low noise function, the operation noise, and the printing speed for each of the printing apparatuses to display the printing apparatuses and the information on the display device 28 in list form. The user may select printing apparatuses to be registered among the list of the displayed printing apparatuses.

The maximum number of destinations as the low-noise-mode job transfer setting is information indicating the maximum number of printing apparatuses to which the print job is transferred. The user can set the maximum number of destinations. It is noted that this maximum number of destinations is not referred in the print control process in this first embodiment which will be described below but is referred in the print control process in the second embodiment which will be described below.

The job dividing method as the low-noise-mode job transfer setting is information indicating a job dividing method which is used when printing on the plurality of sheets are shared among a plurality of printing apparatuses. Various methods may be used as the job dividing method. In the present embodiment, the job dividing method includes (a) a method of dividing all the pages into equal pages (a dividing method A) and (b) a method of dividing, in the case of a multiple number of copies, the number of copies into the equal number of copies (a dividing method B).

When the job dividing method is set at the dividing method A, in the case where a print job for printing of 100 pages is shared between the main MFP 1 and the second MFP 12, the main MFP 1 prints 1-50 pages, and the second MFP 12 prints 51-100 pages, for example. When the job dividing method is set at the dividing method B, in the case where a print job for printing of 20 pages in ten copies is shared between the main MFP 1 and the second MFP 12, the main MFP 1 performs printing of 20 pages in five copies, and the second MFP 12 performs printing of 20 pages in five copies, for example. It should be noted that these dividing methods A, B are merely examples, and other dividing methods may be used.

The three items as the low-noise-mode job transfer setting may be set by the user and are preferably set, with consideration of, e.g., the operation noise caused by each of the printing apparatuses and the position (the relative distance), and the presence or absence of the low noise mode, such that a total operation noise is lower than a sound pressure level of sounds produced in the case where the main MFP 1 performs printing alone in the normal mode. The total operation noise is a sound pressure level measured at the specific position located near the installation position of the main MFP 1, and this sound pressure level is caused due to all the printing apparatuses executing printing in the printing-processing distributing function. Furthermore, the three items as the low-noise-mode job transfer setting are preferably set, with consideration of the printing speed of the printing apparatuses other than the main MFP 1, such that printing using the printing-processing distributing function is completed earlier than in the case where the main MFP 1 performs printing alone in the low noise mode.

In the example in FIG. 3, the cases where the main MFP 1 causes another of other printing apparatuses to perform printing include: a first case where the entire printing is performed by only the first MFP 11; a second case where the printing is shared between the main MFP 1 and the second MFP 12; and a third case where the printing is shared between the first printer 13 and the second printer 14 and is not performed by the main MFP 1.

In the first case, the first MFP 11 is installed in the copy room 5, and the operation noise caused by the first MFP 11 does not reach the vicinity of the main MFP 1. Furthermore, the printing speed of the first MFP 11 in the normal mode is greater than that of the main MFP 1 in the low noise mode. Accordingly, the main MFP 1 causes the first MFP 11 to perform printing in the normal mode on behalf of the main MFP 1, thereby speedily finishing printing with keeping quietness near the main MFP 1.

In the second case, the main MFP 1 and the second MFP 12 perform printing in the low noise mode. Thus, the total operation noise at the specific position near the main MFP 1 is greater than the operation noise caused in the case where the main MFP 1 performs printing alone in the low noise mode. However, the total operation noise is roughly determined at 63 dB according to the following equation (1). That is, this total operation noise is lower than the operation noise caused in the case where the main MFP 1 performs printing alone in the normal mode.

$$\text{the total operation noise [dB]} = 10\log(10^{A/10} + 10^{B/10}) \quad (1)$$
$$= 10\log(10^{60/10} + 10^{60/10})$$
$$= 63$$

In the above-described equation (1), "A" is operation noise caused by the main MFP 1, and "B" is substantial operation noise caused by the second MFP 12. The substantial operation noise is a sound pressure level measured at the specific position near the main MFP 1 due to operation noise caused by the printing apparatus different from the main MFP 1. In the case where there is a printing apparatus in addition to the main MFP 1, operation noise propagates from the printing apparatus to the specific position near the main MFP 1 and is measured at the specific position. The sound pressure level of the operation noise caused by the printing apparatus, which sound pressure level is measured at the specific position, (i.e., the substantial operation noise) decreases with decrease in distance between the main MFP 1 and the printing apparatus. Accordingly, even in the case where the operation noise caused by the printing apparatus is high, this operation noise is not problematic when the printing apparatus is spaced apart from the main MFP 1 at an enough distance, and thus the substantial operation noise at the main MFP 1 is low.

It is assumed in the above-described equation (1) that, considering that the main MFP 1 and the second MFP 12 are located close to each other, the substantial operation noise B caused by the second MFP 12 at the main MFP 1 is substantially equal to actual operation noise caused by the second MPF 12 (that is, substantially 60 dB is obtained near the main MFP 1 for operation noise of 60 dB caused from the second MFP 12). In the second case, as in the first case, the main MFP 1 causes the second MFP 12 to perform printing in the low noise mode, thereby speedily finishing printing without deterioration of quietness near the main MFP 1.

In the third case, printing is performed by the first printer 13 and the second printer 14 which are spaced apart from the main MFP 1 at a distance of about 7 m. Thus, even when the first printer 13 and the second printer 14 are operated at the same time, the total operation noise caused by the first printer 13 and the second printer 14 and measured near the main MFP 1 is low and at least lower than the operation noise caused by the main MFP 1 in the normal mode. Thus, in the third case, as in the first and second cases, the main MFP 1 causes the printers 13, 14 to perform printing, thereby speedily finishing printing without deterioration of quietness near the main MFP 1.

3. Explanation for Printing-Processing Distributing Function

As illustrated in FIG. 3, all the first MFP 11, the second MFP 12, the first printer 13, and the second printer 14 illustrated in FIG. 1 are registered in the print setting table 24a stored in the main MFP 1 according to the first embodiment as the job destination list used for causing the printing apparatus(es) to perform printing.

In this example, priorities 1-4 are respectively assigned to the printing apparatuses in the order from the highest priority. The destination printing apparatus assigned with the priority 1 is the first MFP 11 installed in the copy room 5. The destination printing apparatus assigned with the priority 2 is the second MFP 12 installed next to the main MFP 1. The destination printing apparatus assigned with the priority 3 is the first printer 13 spaced apart from the main MFP 1 at a distance of about 7 m. The destination printing apparatus assigned with the priority 4 is the second printer 14 disposed next to the first printer 13.

When the main MFP 1 receives an instruction for printing on a plurality of sheets in a state in which the main MFP 1 is in the low noise mode, the main MFP 1 determines whether the first MFP 11 assigned with the priority 1 can perform printing on behalf of the main MFP 1. When the printing is possible, the first MFP 11 is set as a print execution apparatus. Here, in the first MFP 11, the dividing attribute is set at "ALONE", and the requirement of own printing is set at "NOT REQUIRED". Thus, in the case where the first MFP 11 is set to the print execution apparatus, the main MFP 1 does not perform printing and causes the first MFP 11 to perform the entire printing.

In the case where the first MFP 11 assigned with the priority 1 cannot perform printing on behalf of the main MFP 1 because the first MFP 11 is performing printing for another print job or is not connected to the network 3, for example, the main MFP 1 determines whether the second MFP 12 assigned with the priority 2 can perform printing on behalf of the main MFP 1. When the printing is possible, the second MFP 12 is set as the print execution apparatus. Here, in the second MFP 12, the dividing attribute is set at "ALONE", and the requirement of own printing is set at "REQUIRED". Thus, in the case where the second MFP 12 is set to the print execution apparatus, printing is shared between the main MFP 1 and the second MFP 12.

As in the first MFP 11, in the case where the second MFP 12 assigned with the priority 2 cannot perform printing on behalf of the main MFP 1 because the second MFP 12 is performing printing for another print job or is not connected to the network 3, for example, the main MFP 1 determines whether the first printer 13 assigned with the priority 3 can perform printing on behalf of the main MFP 1. When the printing is possible, the first printer 13 is set as the print execution apparatus. Here, in the first printer 13, the dividing attribute is set at "TOGETHER", and the requirement of own printing is set at "NOT REQUIRED". Thus, in the case where the first printer 13 is set to the print execution apparatus, the main MFP 1 further determines whether a printing apparatus assigned with the highest priority among the printing apparatuses in which the dividing attribute is set at "TOGETHER" (the second printer 14 assigned with the priority 4 in the example in FIG. 3) can perform printing on behalf of the main MFP 1. When the printing is possible, the second printer 14 is also set as the print execution apparatus.

In this case, the main MFP 1 divides a print job into two partial print jobs and transmits the partial print jobs to the respective printers 13, 14, so that the printers 13, 14 share printing on a plurality of sheets. It is noted that the main MFP 1 can determine how to perform printing in the case where only one of the first printer 13 and the second printer 14 can perform printing on behalf of the main MFP 1. For example, the main MFP 1 may output a message indicating that printing is not shared with other printing apparatuses, and the main MFP 1 may perform printing in the low noise mode. As another example, printing may be shared between the main MFP 1 and the one of the first printer 13 and the second printer 14 which can perform printing on behalf of the main MFP 1.

Figure 4:
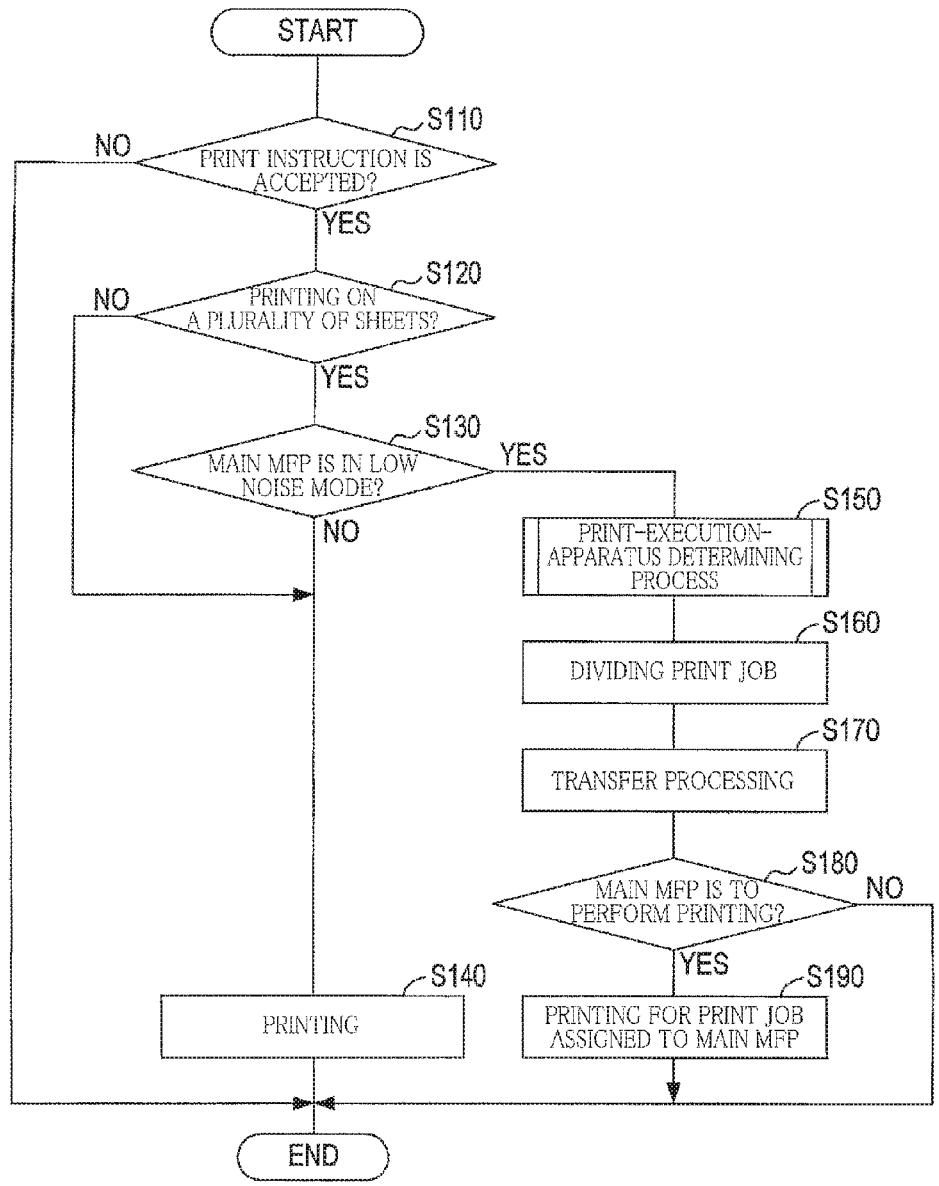
FIG. 4 is a flow chart illustrating a print control process.

There will be next explained, with reference to FIG. 4, the print control process which is executed by the CPU 21 of the main MFP 1 to achieve the printing-processing distributing function. The CPU 21 of the main MFP 1 periodically executes the print control process in FIG. 4 after the main MFP 1 is turned on.

The flow of the print control process begins with S110 at which the CPU 21 determines whether a print instruction is accepted for a print job. When the print instruction is not accepted (S110: NO), this flow ends. When the print instruction is accepted (S110: YES), the CPU 21 at S120 determines whether the print instruction is for printing on a plurality of sheets. When the print instruction is for printing on one sheet (S120: NO), this flow goes to S140. The CPU 21 at S140 controls the main MFP 1 to perform printing for the entire print job transmitted with the print instruction.

When the print instruction is for printing on a plurality of sheets (S120: YES), the CPU 21 at S130 determines whether the operation mode of the main MFP 1 is set at the low noise mode. When the operation mode of the main MFP 1 is not set at the low noise mode, that is, when the operation mode of the main MFP 1 is set at the normal mode (S130: NO), this flow goes to S140 at which the CPU 21 controls the main MFP 1 to perform printing for the entire print job.

When the operation mode of the main MFP 1 is set at the low noise mode (S130: YES), the CPU 21 at S150 executes a print-execution-apparatus determining process. In this print-execution-apparatus determining process, the CPU 21 determines which printing apparatus or apparatuses including the main MFP 1 are to perform printing for the print job transmitted with the print instruction. In the print-execution-apparatus determining process, specifically, the CPU 21 determines whether printing for the entire print job is to be performed by the printing apparatus or apparatuses other than the main MFP 1, or the printing for the print job is shared between or among the main MFP 1 and the printing apparatus or apparatuses other than the main MFP 1, and in the case where the printing is performed by the printing apparatus or apparatuses other than the main MFP 1, the CPU 21 determines which printing apparatus or apparatuses are used to perform the printing.

The CPU 21 at S160 divides the print job according to the job dividing method set in the print setting table 24*a* based on the number of the print execution apparatuses which is determined at S150. It is noted that when the number of the print execution apparatus is one, the CPU 21 at S160 assigns the entire print job to the one print execution apparatus.

The CPU 21 at S170 executes a transfer processing for transmitting data contained in the print job. Specifically, the CPU 21 transmits proxy print data to the print execution apparatus or apparatuses (the printing apparatus or apparatuses) other than the main MFP 1 among the print execution apparatuses determined at S150. The proxy print data is data on a portion of the print job which is assigned at S160 (i.e., a portion of the print job which is to be performed on behalf of the main MFP 1). The CPU 21 then instructs the print execution apparatus or apparatuses to perform printing based on the proxy print data. As a result, the printing apparatus different from the main MFP 1 performs printing based on the proxy print data transmitted from the main MFP 1. In the transfer processing at S170, when the printing apparatus or apparatuses other than the main MFP 1 is to perform proxy printing and when the printing apparatus or apparatuses include the printing apparatus in which the operation mode should be set to the low noise mode, the CPU 21 sends the printing apparatus the low noise instruction for instructing the printing apparatus to set its operation mode to the low noise mode. Upon receiving the low noise instruction from the main MFP 1, the printing apparatus sets its operation mode to the low noise mode and then performs printing based on the proxy print data.

The CPU 21 at S180 determines whether the main MFP 1 should perform printing. That is, the CPU 21 determines whether the main MFP 1 is set as the print execution apparatus in the print-execution-apparatus determining process at S150. When the main MFP 1 is not required for printing, that is, when the printing apparatuses other than the main MFP 1 are to perform the entire printing on behalf of the main MFP 1 (S180: NO), this flow ends.

Figure 5:
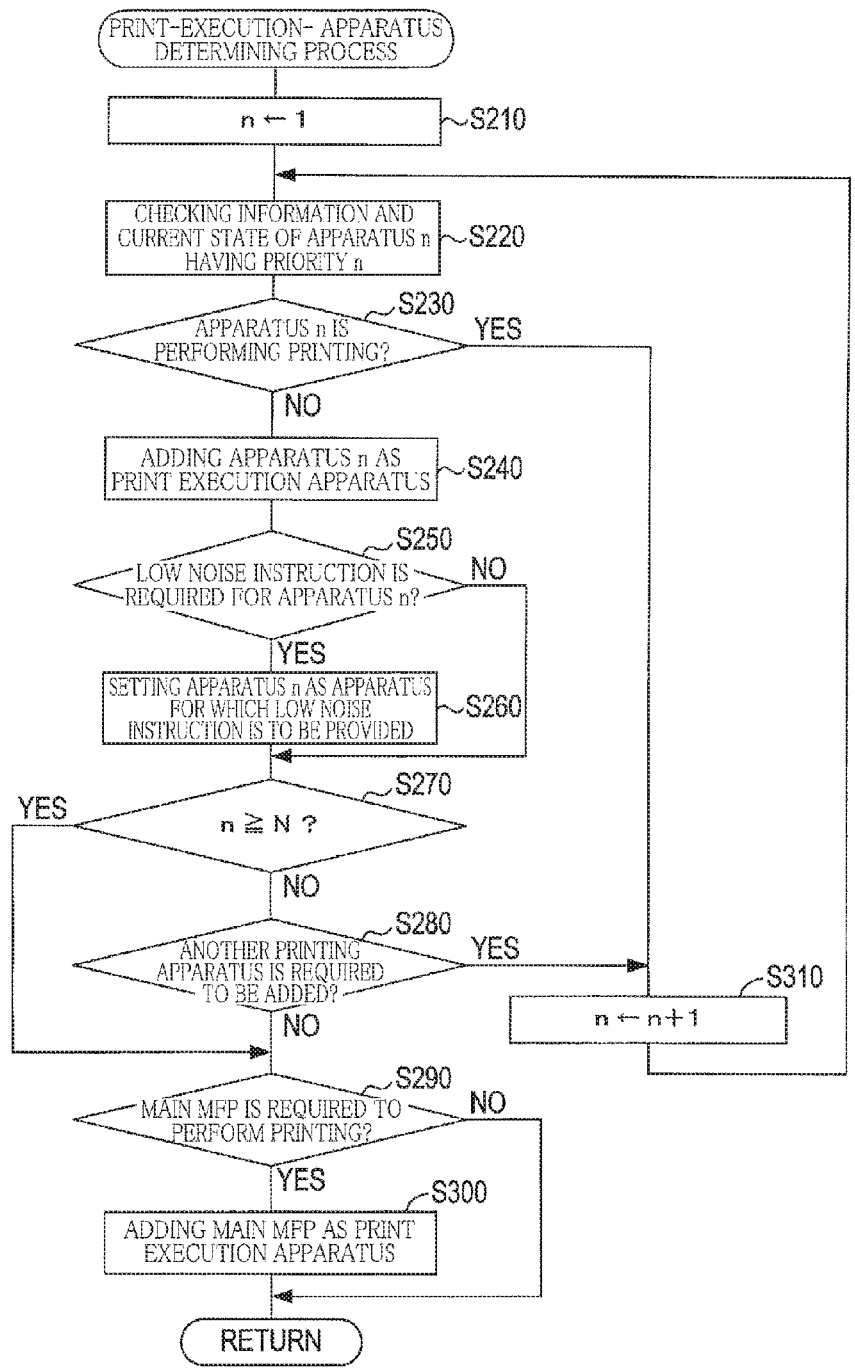
FIG. 5 is a flow chart illustrating a print-execution-apparatus determining process in a first embodiment.

When the main MFP 1 is set as the print execution apparatus (S180: YES), the CPU 21 at S190 controls the main MFP 1 to perform printing for the print job assigned to the main MFP 1 at S160. There will be next explained a flow of the print-execution-apparatus determining process at S150 in detail with reference to FIG. 5. This flow begins with S210 at which the CPU 21 sets a count value n to one. The CPU 21 at S220 checks information about and a current state of a printing apparatus assigned with a priority n in the print setting table 24*a* (which may be hereinafter referred to as "apparatus n"). Information about the apparatus n can be received from the information registered in the job destination list stored in the print setting table 24*a*. Also, the current state of the apparatus n here indicates at least a printing operation state of the apparatus n. The printing operation state of the apparatus n can be received from the apparatus n by inquiring of the apparatus n over data communication with the apparatus n.

The CPU 21 at S230 determines whether the apparatus n is performing printing. When the apparatus n is performing printing (S230: YES), the CPU at S310 increments the count value n by one, and this flow returns to S230. When the apparatus n is not performing printing (S230: NO), the CPU 21 at S240 adds the apparatus n as the print execution apparatus.

The CPU 21 at S250 determines whether the low noise instruction is required for the apparatus n, based on the setting information about the low noise instruction for the apparatus n in the job destination list stored in the print setting table 24a. When the low noise instruction is not required for the apparatus n (S250: NO), this flow goes to S270. When the low noise instruction is required for the apparatus n (S250: YES), the CPU 21 at S260 sets the apparatus n as an apparatus for which the low noise instruction is to be provided, and this flow goes to S270. When the processing at S260 is executed for the apparatus n, the CPU 21 in the transfer processing (at S160 in FIG. 4) after this processing sends the apparatus n the low noise instruction in addition to the data contained in the print job.

The CPU 21 at S270 determines whether the count value n is equal to or greater than the number of registered apparatuses N. The number of registered apparatuses N is a total of the destination printing apparatuses registered in the job destination list stored in the print setting table 24a. In the example in FIG. 3, the four printing apparatuses assigned with the priorities 1-4 are registered, and thus the number of registered apparatuses N is four.

When the count value n is greater than or equal to the number of registered apparatuses N (S270: YES), this flow goes to S290. When the count value n is less than the number of registered apparatuses N (S270: NO), the CPU 21 at S280 determines whether another printing apparatus is required to be added as the print execution apparatus. The CPU 21 executes this determination based on the dividing attribute set in the print setting table 24a for the printing apparatus added at S240 as the print execution apparatus. When the dividing attribute is "TOGETHER", the CPU 21 determines that another printing apparatus is required to be added (S280: YES), and this flow goes to S310. When the dividing attribute is "ALONE", the CPU 21 determines that another printing apparatus is not required to be added (S280: NO), this flow goes to S290.

The CPU 21 at S290 determines whether the main MFP 1 is also to perform printing. The CPU 21 executes this determination based on information about the requirement of own printing which is set in the print setting table 24a for the printing apparatus added at S240 as the print execution apparatus. When the requirement of own printing is set at "NOT REQUIRED" (S290: NO), the CPU 21 terminates the print-execution-apparatus determining process and executes the processing at S160 in FIG. 4. When the requirement of own printing is set at "REQUIRED" (S290: YES), the CPU 21 at S300 adds the main MFP 1 as the print execution apparatus, and the CPU 21 executes the processing at S160 (FIG. 4).

4. Proxy Print Process by Other Apparatuses

Figure 6:
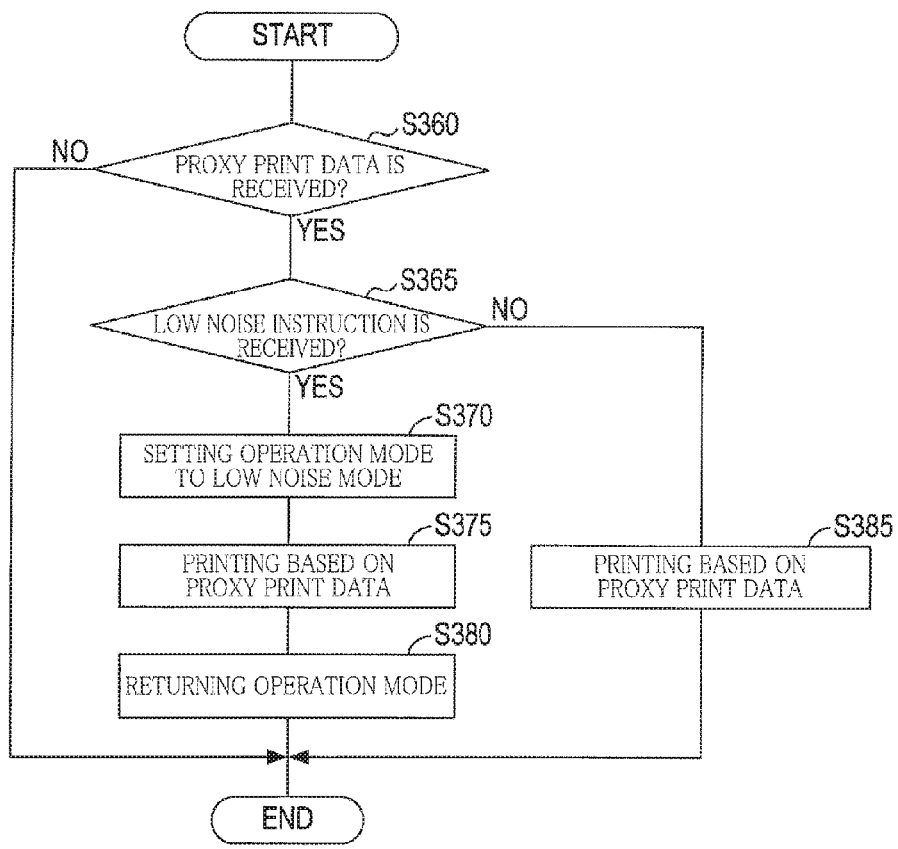
FIG. 6 is a flow chart illustrating a proxy print process.

There will be next explained, with reference to FIG. 6, a flow of a proxy print process which is executed by the printing apparatus different from the main MFP 1 to achieve the proxy printing function. The CPU of the printing apparatus periodically executes the proxy print process in FIG. 6 after the printing apparatus is turned on.

The proxy print process begins with S360 at which the CPU of the printing apparatus determines whether the CPU receives the proxy print data. When the proxy print data is not received (S360: NO), this flow ends.

When the proxy print data is received (S360: YES), the CPU at S365 determines whether the CPU receives the low noise instruction. When the low noise instruction is not received (S365: NO), the CPU at S385 controls the printing apparatus to perform printing based on the proxy print data.

When the low noise instruction is received (S365: YES), the CPU at S370 sets the operation mode to the low noise mode and at S375 controls the printing apparatus to perform printing based on the proxy print data. Upon the completion of the printing, the CPU at S380 returns the operation mode. That is, the CPU switches the operation mode back to the operation mode that is set before the operation mode is set to the low noise mode at S370.

In the case where the printing apparatus does not have the low noise mode as the operation mode, the processings at S365-S380 are not necessary.

5. Effects in First Embodiment

In the image forming system in this first embodiment, as described above, the main MFP 1 has the printing-processing distributing function, and the printing apparatuses other than the main MFP 1 have the proxy printing function. When the main MFP 1 receives a print instruction for printing on a plurality of sheets in a state in which its operation mode is set at a specific mode (i.e., the low noise mode), the main MFP 1 instructs at least one of the other printing apparatuses to perform printing on at least one of the sheets on behalf of the main MFP 1. Thus, even when the operation mode is set at the low noise mode, this image forming system can finish printing earlier than in the case where only the main MFP 1 perform the entire printing.

When the main MFP 1 uses the printing-processing distributing function to cause another or other printing apparatuses to perform printing, the main MFP 1 instructs the printing apparatus or apparatuses to set their operation mode to the low noise mode when needed. Specifically, in this first embodiment, when the printing apparatus or apparatuses caused to perform printing on behalf of the main MFP 1 have the low noise mode as the operation mode and when the information about the requirement of the low noise instruction in the print setting table 24a is set at "REQUIRED" for the printing apparatus or apparatuses, the main MFP 1 transmits the low noise instruction to the printing apparatus or apparatuses to cause the printing apparatus or apparatuses to set their operation mode to the low noise mode. Since the printing apparatus or apparatuses are operated in the low noise mode, the total operation noise can be further reduced.

In this first embodiment, the user can set and register, into the print setting table 24a, the printing apparatuses caused to perform printing on behalf of the main MFP 1. In this operation, the user can also set priority. In addition, the user can set the various kinds of parameters such as the requirement of the low noise instruction, the position attribute, the dividing attribute, and the requirement of own printing. This configuration enables the main MFP 1 to determine the printing apparatus or apparatuses used for printing on behalf of the main MFP 1.

In the present embodiment, the printing device 26 is one example of an image forming device. The network interface 29 is one example of a communication device. Each of the printing apparatuses 11-14 is one example of an external device. The CPU 21 is one example of a controller. The NVRAM 24 is one example of a storage. The copy room 5 is one example of a specific position.

Second Embodiment

An image forming system in a second embodiment differs from the image forming system in the first embodiment in a portion of the print control process to be executed by the main MFP 1. Specifically, the print-execution-apparatus determining process at S150 in the print control process illustrated in FIG. 4 is the process illustrated in FIG. 5 in the first embodiment but is a process illustrated in FIG. 7 in this second embodiment.

Figure 7:
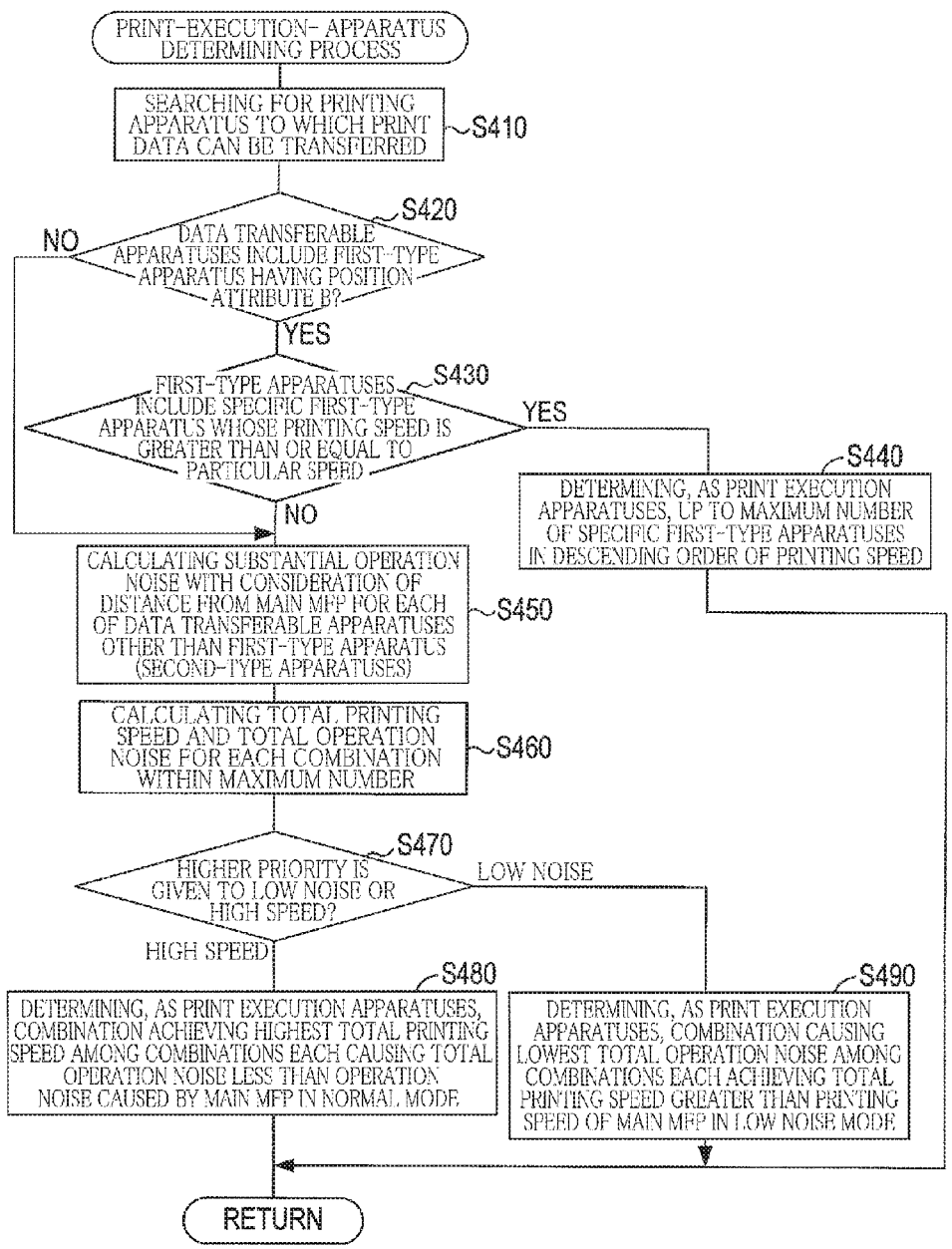
FIG. 7 is a flow chart illustrating a print-execution-apparatus determining process in a second embodiment.

There will be next explained, with reference to FIG. 7, a print-execution-apparatus determining process in this second embodiment. The print-execution-apparatus determining process in FIG. 7 begins with S410 at which the CPU 21 of the main MFP 1 searches for the printing apparatus or apparatuses to which the CPU 21 can transfer print data, i.e., the printing apparatus or apparatuses which can perform printing on at least one sheet on behalf of the main MFP 1. Specifically, the CPU 21 inquires of the printing apparatuses connected to the network 3 about whether or not printing is being performed or to be performed (whether or not printing is being performed or there is a print waiting job). The CPU 21 recognizes the printing apparatuses that are not performing or not to perform printing, as the printing apparatuses to which the CPU 21 can transfer print data (hereinafter may be referred to as "data transferable apparatus").

It is noted that the printing apparatuses for which the CPU 21 searches at S410 may be limited to the printing apparatuses registered in the print setting table 24a. In this case, the user may register the printing apparatuses that are to perform printing, into the job destination list in the print setting table 24a, and the main MFP 1 may regularly detect the printing apparatuses connected to the network 3 and register the detected printing apparatuses (i.e., the printing apparatuses connected to the network 3 and enabled to perform data communication with the main MFP 1).

In the processing at S410, the CPU 21 receives other kinds of information for the detected data transferable apparatus such as the operation noise, the printing speed, the position attribute, and the distance from the main MFP 1 for the data transferable apparatus. These kinds of information may be received by the CPU 21 from the data transferable apparatus by directly inquiring of the data transferable apparatus and may be received from the print setting table 24a to which the information is registered in advance. Also, a portion or the entirety of the information may be received from an external server (e.g., a server managed by a vendor of the data transferable apparatus). For example, the CPU 21 may transmit the name of the data transferable apparatus to the server and request the information relating to the data transferable apparatus to receive the information from the server. In the case where each of the main MFP 1 and the data transferable apparatus has information about the position thereof, the CPU 21 may receive positional information about the main MFP 1 and the data transferable apparatus and calculate the distance between the main MFP 1 and the data transferable apparatus based on the positional information about the main MFP 1 and the data transferable apparatus. For example, in the case where each of the main MFP 1 and the data transferable apparatus has a current-position detecting function using a global positioning system (GPS), the CPU 21 calculates the distance based on the positional information about the main MFP 1 and the data transferable apparatus which is detected using the current-position detecting function.

The CPU 21 at S420 determines whether the data transferable apparatuses detected at S410 include at least one apparatus having the position attribute B (hereinafter may be referred to as "first-type apparatus"). When the first-type apparatus is absent (S420: NO), this flow goes to S450. When at least one first-type apparatus is present (S420: YES), this flow goes to S430. The CPU 21 at S430 determines whether the at least one first-type apparatus includes at least one specific first-type apparatus in which the printing speed is greater than or equal to a particular speed. The particular speed may be determined at any speed but is preferably set at a speed at least greater than the printing speed of the main MFP 1 in the low noise mode.

When at least one specific first-type apparatus is present (S430: YES), this flow goes to S440. The CPU 21 at S440 determines, as the print execution apparatuses, up to the maximum number of the specific first-type apparatuses in descending order of printing speed. The maximum number may be determined at any number, and the maximum number of destinations set in the print setting table 24a may be used, for example. In the case where there are a plurality of the specific first-type apparatuses, and the maximum number is a plural number, the CPU 21 can determine which specific first-type apparatuses are to be used as the print execution apparatuses and how many specific first-type apparatuses are to be used as the print execution apparatuses, according to parameters such as the distance from the main MFP 1 and the printing speed. The CPU 21 normally determines the specific first-type apparatuses to the print execution apparatuses in the descending order of printing speed. However, in the case where there are two apparatuses A, B as the specific first-type apparatuses, and the printing speed of the apparatus A is greater than that of the apparatus B, but the distance between the apparatus A and the main MFP 1 is greater than the distance between the apparatus B and the main MFP 1, for example, the CPU 21 may determine the apparatus B as the print execution apparatus, depending upon a difference in these distances. Of course, the CPU 21 may determine the apparatus A as the print execution apparatus by giving high priority to the printing speed and may determine both of the apparatuses A, B as the print execution apparatuses to finish printing speedily.

When the CPU 21 at S430 determines that the specific first-type apparatus is absent (S430: NO), this flow goes to S450. The CPU 21 at S450 calculates the substantial operation noise with consideration of the distance from the main MFP 1 for each of the data transferable apparatuses other than the first-type apparatus (each of which may be referred to as "second-type apparatus"). In the case where the second-type apparatuses have the low noise mode, the substantial operation noise calculated here may be each of the substantial operation noise in the low noise mode, the substantial operation noise in the normal mode, and the substantial operation noise in each of the low noise mode and the normal mode. Also, the CPU 21 may calculate the substantial operation noise corresponding to the current operation mode of the second-type apparatus.

The CPU 21 at S460 calculates the total speed and the total operation noise for each combination of the main MFP 1 and the second-type apparatuses within the maximum number. It is noted that this combination may include the case where the number of the second-type apparatuses is one. For example, in the case where there are two apparatuses A, B as the second-type apparatuses, and the maximum number is set at three, there are seven combinations within the maximum number: the main MFP 1, the apparatus A, and the apparatus B; the main MFP 1 and the apparatus A; the main MFP 1 and the apparatus B; the apparatus A and the apparatus B; only the main MFP 1; only the apparatus A; and only the apparatus B.

The CPU 21 at S460 calculates the total printing speed and the total operation noise for each of the combinations within the maximum number. The total printing speed is obtained as follows: assuming that the printing apparatuses contained in the combination start printing at the same time, the total printing speed is obtained by dividing a length of time between the start of the printing and the completion of the printing (i.e., the end of printing to be finished at the last timing among the printing apparatuses), by the total number of printing pages (sheets). The total operation noise may be calculated based on the substantial operation noise calculated at S450.

In the case where the combination contains the second-type apparatus, the CPU 21 calculates the total operation noise based on the substantial operation noise for the second-type apparatus which is calculated at S450. For example, in the case where the CPU 21 at S450 calculates the substantial operation noise in the low noise mode for the apparatus A, for example, the CPU 21 calculates the total operation noise using the calculated substantial operation noise in the low noise mode for the combination of the main MFP 1 and the apparatus A. Also, in the case where the CPU 21 at S450 has calculated the substantial operation noise in each of the low noise mode and the normal mode for the apparatus A, for example, the CPU 21 calculates the total operation noise for the substantial operation noise calculated in each mode for the combination of the main MFP 1 and the apparatus A. That is, in this example, the combination of the main MFP 1 and the apparatus A is divided into the combination of the main MFP 1 and the apparatus A, the combination of the main MFP 1 and the apparatus A in the low noise mode, and the combination of the main MFP 1 and the apparatus B in the normal mode.

The CPU 21 at S470 determines whether high priority is given to low noise or high speed for determination of the printing apparatuses to be used. This setting may be performed by the user as needed. The user gives high priority to high speed in the case where the user desires the fastest completion of printing with a certain degree of quietness. The user gives high priority to low noise in the case where the user desires the lowest quietness with a certain degree of the total printing speed.

When high priority is given to high speed at S470, this flow goes to S480. The CPU 21 at S480 extracts, from the above-described combinations, combinations each of which causes the total operation noise less than the operation noise caused by the main MFP 1 in the normal mode. The CPU 21 then determines, as the print execution apparatus or apparatuses, the combination achieving the highest total printing speed among the extracted combinations.

When high priority is given to low noise at S470, this flow goes to S490. The CPU 21 at S490 extracts, from the above-described combinations, combinations each of which achieves the total printing speed greater than the printing speed of the main MFP 1 in the low noise mode. The CPU 21 then determines, as the print execution apparatus or apparatuses, the combination causing the lowest total operation noise among the extracted combinations.

In the case where the CPU 21 at S480 or S490 determines the main MFP 1 and the apparatus A in the low noise mode as the print execution apparatuses, for example, the CPU 21 transmits the low noise instruction to the apparatus A in the transfer processing at S170 in FIG. 4. In the case where the CPU 21 at S480 or S490 determines the main MFP 1 and the apparatus A in the normal mode as the print execution apparatuses, for example, the CPU 21, in the transfer processing at S170 in FIG. 4, sends the apparatus A an instruction for causing the apparatus A to perform proxy printing in the normal mode.

It is noted that high priority may be given to a distance instead of low noise or high speed, for example. When higher priority is given to the distance, the CPU 21 may extract, from the above-described combinations, combinations in each of which the total operation noise is less than the operation noise caused by the main MFP 1 in the normal mode, and the total printing speed is greater than the printing speed of the main MFP 1 in the low noise mode. In this case, the CPU 21 may determine, as the print execution apparatus or apparatuses, the combination in which the distance between the main MFP 1 and the printing apparatus is the shortest among the extracted combinations.

In the image forming system in this second embodiment as described above, in the case where the data transferable apparatuses contain the first-type apparatus (e.g., the first MFP 11 disposed in the copy room 5), the CPU 21 can cause the first-type apparatus to perform the entire printing on behalf of the maim MFP 1. In this case, the main MFP 1 does not perform printing, so that printing on a plurality of sheets can be quickly finished without causing operation noise from the main MFP 1.

In the case where the CPU 21 cannot cause the first-type apparatus to perform printing on behalf of the maim MFP 1, the CPU 21 determines an optimum combination from among possible combinations not containing the first-type apparatus within the maximum number. In addition, the user can give high priority to low noise or high speed for the determination of the combination. When high priority is given to high speed, the CPU 21 determines a combination achieving the greatest printing speed without the total operation noise being greater than or equal to the operation noise caused by the main MFP 1 in the normal mode. When high priority is given to low noise, the CPU 21 determines a combination causing the lowest total operation noise without the total printing speed being less than or equal to the printing speed of the main MFP 1 in the low noise mode. Any of these cases includes (i) the case where the main MFP 1 is determined as the print execution apparatus, and printing is shared between or among the main MFP 1 and another or other printing apparatuses and (ii) the case where the main MFP 1 is not determined as the print execution apparatus, and printing is performed only one or more of the printing apparatuses other than the main MFP 1.

Modifications

While the embodiments have been described above, it is to be understood that the disclosure is not limited to the details of the illustrated embodiments, but may be embodied with various changes and modifications, which may occur to those skilled in the art, without departing from the spirit and scope of the disclosure.

While the operation noise is defined as the sound pressure level in the above-described embodiments, any parameter may be used for each of the operation noise and the total operation noise. The strength of sound at a single specific position may be defined as the operation noise (for example, the sound pressure level at the specific position may be defined as the operation noise). A value determined comprehensively considering the strength of sound at a plurality of specific positions may be defined as the operation noise (for example, the average of the sound pressure levels at the plurality of the specific positions may be defined as the operation noise).

The method in which the main MFP 1 determines the printing apparatuses caused to perform printing on behalf of the main MFP 1 in the low noise mode is not limited to the above-described methods. The CPU 21 may determine which printing apparatus or apparatuses are caused to perform printing on behalf of the main MFP 1, how many printing apparatuses are caused to perform printing on behalf of the main MFP 1, and whether the main MFP 1 is used to perform printing, for example, as long as the entire printing is completed earlier than in the case where only the main MFP 1 performs the printing in the low noise mode with the total operation noise being less than the operation noise caused by the main MFP 1 in the normal mode.

Not only the main MFP 1 but also the MFPs 11, 12 and the printers 13, 14 may have the printing-processing distributing function. The main MFP 1 may have the proxy printing function. The main MFP 1 may perform printing for a portion of the entirety of a print job in accordance with a request from another or other MFPs and a printer or printers having the printing-processing distributing function.

Each of the MFPs 11, 12 and the printers 13, 14 is merely one example of the printing apparatus to which the main MFP 1 transmits the print request. The number and type of the printing apparatuses to which the main MFP 1 transmits the print request, the presence or absence of the low noise mode, the installation position, and the method of communication with the main MFP 1 are not limited in particular.

Apparatuses and devices to which the present disclosure is applied are not limited to the main MFP 1 having the low noise mode as the operation mode. The present disclosure may be applied to any image forming apparatuses having a specific mode in which a printing speed is less than that in a normal mode.

For example, the present disclosure may be applied to an image forming apparatus having a specific mode (e.g., a high image quality mode) in which printing can be performed with high image quality although a printing speed is less than that in a normal mode. In the case where the image forming apparatus causes another or other printing apparatuses to perform a portion or the entirety of printing in the high image quality mode on behalf of the image forming apparatus, the printing apparatus or apparatuses need to be capable of performing printing with high image quality similar to the image quality in the high image quality mode of the image forming apparatus.

In the case where the scanner 16 has a low noise mode in which operation noise caused by the scanner 16 during document scanning is less than that in a normal mode, the main MFP 1 may perform printing in the following method. That is, it is assumed that the scanner 16 performs scanning in the low noise mode and transmits obtained scan data to the main MFP 1. In this case, the scanner 16 also transmits a notification indicating that the scanner 16 has performed scanning in the low noise mode, in other words, the main MFP 1 should perform printing based on the scan data in the low noise mode. The main MFP 1 having received the notification sets its operation mode to the low noise mode and performs printing based on the scan data received from the scanner 16.

That is, the situation in which the scanner 16 has performed scanning in the low noise mode indicates that a place where the scanner 16 is located needs to be kept quiet. In this situation, the main MFP 1 should perform printing based on the scan data with operation noise reduced as possible. Thus, in the case where the main MFP 1 performs printing based on the scan data, the main MFP 1 is set to the low noise mode, whereby a series of operations from the scanning of the document to the printing based on the scan data can be performed while keeping quietness as possible.

A function of one device in the above-described embodiments may be divided among a plurality of devices, and a single device may have functions of a plurality of devices. The configuration in the above-described embodiments may be at least partly replaced with a well-known configuration having similar functions. The configuration in the above-described embodiments may be partly omitted. The configuration in the above-described embodiments may be at least partly added to or replaced with another configuration in the above-described embodiments.

What is claimed is:

1. An image forming apparatus, comprising:
an image forming device configured to form an image on a recording medium;
a communication device configured to perform data communication with at least one external image forming apparatus; and
a controller configured to perform:
receiving an image forming instruction for instructing image forming on a plurality of recording media each as the recording medium;
determining whether a mode of the image forming to be performed by the image forming device is a first mode or a second mode, in response to receiving the image forming instruction for instructing the image forming on the plurality of recording media, the first mode being a mode in which a speed of the image forming is a first speed, the second mode being a mode in which the speed of the image forming is a second speed less than the first speed, a level of sound pressure by the image forming apparatus when the image forming of the image forming apparatus in the second mode being less than the level of the sound pressure of the image forming apparatus when the image forming by the image forming apparatus in the first mode;
in a case where that the mode of the image forming to be performed by the image forming device is the second mode:
determining that another image forming apparatus to be used to perform first image forming is at least one first external image forming apparatus, the first image forming being the image forming on at least one recording medium in the image forming on the plurality of recording media based on the image forming instruction, the at least one first external image forming apparatus being at least one of the at least one external image forming apparatus;
controlling the communication device to transmit image data relating to the first image forming to the at least one first external image forming apparatus; and
when the image forming on the plurality of recording media comprises second image forming different from the first image forming, controlling the image forming device to form the image relating to the second image forming, and
in a case where the mode of the image forming to be performed by the image forming device is in the first mode, controlling the communication device to not transmit the image data relating to the image forming on the plurality of recording media, and controlling the image forming device to form the image relating to the image forming on the plurality of recording media at the first speed,
wherein the controller is further configured to:
receive noise information indicating a magnitude of operation noise caused by each of the at least one external image forming apparatus in the image forming; and determine the at least one first external image forming apparatus, from among the at least one external image forming apparatus, by assigning a high priority to one or more of the at least one external image forming apparatus causing lower operation noise than at least one other of the at least one external image forming apparatus based on the received noise information.

2. The image forming apparatus according to claim 1, wherein the controller is configured to, when the at least one first external image forming apparatus comprises at least one second external image forming apparatus comprising the second mode as the mode of the image forming, control the communication device to send the at least one second external image forming apparatus an instruction that instructs the at least one second external image forming apparatus to set the mode of the image forming to the second mode.

3. The image forming apparatus according to claim 1, wherein the controller is configured to:
assign the image data relating to the image forming instruction to the at least one first external image forming apparatus and the image forming apparatus;
control the communication device to send the at least one first external image forming apparatus the image data assigned to the at least one first external image forming apparatus; and
control the image forming device to form the image based on the image data assigned to the image forming apparatus.

4. The image forming apparatus according to claim 1, wherein the controller is configured to:
determine whether the at least one first external image forming apparatus comprises a third external image forming apparatus located at a specific location;
select the third external image forming apparatus to perform an entirety of image formation relating to the image forming instruction when the at least one first external image forming apparatus comprises the third external image forming apparatus; and
control the communication device to transmit all image data relating to the image forming instruction to the third external image forming apparatus.

5. The image forming apparatus according to claim 1, further comprising a storage device configured to store information of the at least one external image forming apparatus,
wherein the controller is configured to determine the at least one first external image forming apparatus from among the at least one external image forming apparatus for which information is stored in the storage device.

6. The image forming apparatus according to claim 5, wherein the controller is configured to:
determine whether each of the at least one external image forming apparatus stored in the storage device is currently performing the image forming or is expected to perform image forming; and
in response to determining that one or more of the at least one external image forming apparatus are not currently performing image forming or are expected to perform image forming, determine the at least one first external image forming apparatus from among the one or more of the at least one external image forming apparatus.

7. The image forming apparatus according to claim 5, wherein the storage device is configured to store priority information indicating a priority of each of the at least one external image forming apparatus, and
wherein the controller is configured to determine the at least one first external image forming apparatus, from among the at least one external image forming apparatus stored in the storage device, in descending priority order based on the priority information.

8. The image forming apparatus according to claim 1, wherein the at least one external image forming apparatus includes a plurality of external image forming apparatuses, and
wherein the controller is configured to:
receive, as the noise information, information indicating the level of the sound pressure at a physical location of the image forming apparatus; and
determine the at least one first external image forming apparatus, from among the at least one external image forming apparatus, by assigning high priority to one or more of the at least one external image forming apparatus achieving a lower level of sound pressure at the physical location than the at least one other external image forming apparatus of the plurality of external image forming apparatuses.

9. The image forming apparatus according to claim 1, wherein the controller is configured to:
receive speed information indicating a speed of image forming performed by each of the at least one external image forming apparatus; and
determine the at least one first external image forming apparatus, from among the at least one external image forming apparatus, by assigning the high priority to one or more of the at least one external image forming apparatus achieving a higher speed of image forming than at least one other of the at least one external image forming apparatus based on the received speed information.

10. The image forming apparatus according to claim 9, wherein the controller is configured to determine the at least one first external image forming apparatus such that the level of the sound pressure at a physical location of the image forming apparatus, when the image forming is simultaneously performed by all of one or more image forming apparatuses that are to execute the image forming based on the image forming instruction, is less than the level of sound pressure at the physical location when the image forming is performed by only the image forming apparatus in the first mode.

11. The image forming apparatus according to claim 1, wherein the controller is configured to determine the at least one first external image forming apparatus such that the level of the sound pressure at a physical location of the image forming apparatus when the image forming of the image forming apparatus in the second mode and the image forming by the at least one first external image forming apparatus are performed simultaneously is less than the level of sound pressure at the physical location when the image forming is performed by the image forming apparatus in the first mode.

12. The image forming apparatus according to claim 1, wherein the controller is configured to determine the at least one first external image forming apparatus such that the level of sound pressure at a physical location of the image forming apparatus when the image forming is performed by all of the at least one first external image forming apparatus is less than the level of sound pressure at the physical location when the image forming is performed by the image forming apparatus in the first mode.

13. The image forming apparatus according to claim 12, wherein the controller is configured to:
when only one first external image forming apparatus is determined as the at least one first external image forming apparatus, assign all image data relating to the image forming instruction to the one first external image forming apparatus; and when a plurality of the first external image forming apparatuses are determined as the at least one first external image forming apparatus, control the communication device to transmit all the image data relating to the image forming instruction to the plurality of the first external image forming apparatuses.

* * * * *